(12) United States Patent
Klusacek

(10) Patent No.: US 9,394,791 B2
(45) Date of Patent: Jul. 19, 2016

(54) ROTOR

(71) Applicant: Bosch Mahle Turbo Systems GmbH & Co. KG, Stuttgart (DE)

(72) Inventor: Michal Klusacek, Prague (CZ)

(73) Assignee: BOSCH MAHLE TURBO SYSTEMS GMBH & CO. KG (DE)

(*) Notice: Subject to any disclaimer, the term of this patent is extended or adjusted under 35 U.S.C. 154(b) by 697 days.

(21) Appl. No.: 13/767,869

(22) Filed: Feb. 14, 2013

(65) Prior Publication Data

US 2013/0209267 A1 Aug. 15, 2013

(30) Foreign Application Priority Data

Feb. 15, 2012 (DE) .................. 10 2012 202 272

(51) Int. Cl.
*F01D 5/02* (2006.01)
*F01D 5/04* (2006.01)
*F02C 6/12* (2006.01)

(52) U.S. Cl.
CPC ...... *F01D 5/02* (2013.01); *F01D 5/048* (2013.01); *F02C 6/12* (2013.01); F05D 2220/40 (2013.01); F05D 2300/133 (2013.01); F05D 2300/611 (2013.01)

(58) Field of Classification Search
CPC ............ F01D 5/02; F01D 5/048; F02C 6/12; F05D 2220/40; F05D 2300/133; F05D 2300/611
See application file for complete search history.

(56) References Cited

U.S. PATENT DOCUMENTS

| 4,557,704 A * | 12/1985 | Ito ............... F01D 5/026 415/216.1 |
| 4,639,194 A * | 1/1987 | Bell, III ........... F01D 5/025 415/216.1 |
| 4,942,999 A * | 7/1990 | Oda ............... C04B 37/026 416/241 B |
| 7,942,635 B1 * | 5/2011 | Murray ............ F01D 5/026 415/142 |
| 2010/0003132 A1 * | 1/2010 | Holzschuh ........ F01D 5/025 415/230 |
| 2010/0050633 A1 * | 3/2010 | Jennes ............ B23K 28/00 416/244 A |

FOREIGN PATENT DOCUMENTS

| DE | 102005007404 B3 | 3/2006 |
| DE | 102009014005 A1 | 9/2010 |
| DE | 102010010965 A1 | 11/2011 |

OTHER PUBLICATIONS

English abstract for DE102010010965.
English abstract for DE102009014005.
English abstract for DE102005007404.
German Search Report for DE 102012202272.4.

* cited by examiner

*Primary Examiner* — Igor Kershteyn
(74) *Attorney, Agent, or Firm* — Fishman Stewart PLLC

(57) ABSTRACT

A rotor of a charging device may include at least two parts fastened to each other and configured to enclose a hollow space. The two parts may be fastened to each other via a negative pressure within the hollow space.

20 Claims, 1 Drawing Sheet

ROTOR

CROSS-REFERENCE TO RELATED APPLICATION

This application claims priority to German Patent Application 10 2012 202 272.4, filed Feb. 15, 2012, which is hereby incorporated by reference in its entirety.

TECHNICAL FIELD

The present invention relates to a rotor of a charging device, in particular of an exhaust gas turbocharger, having at least two parts fastened to one another. In addition, the invention relates to a charging device, in particular to an exhaust gas turbocharger having such a rotor.

BACKGROUND

From DE 10 2009 014 005 A1 a charging device having a rotor is known, which carries a compressor wheel and a turbine wheel. The rotor rotates about an axis of rotation and comprises a disc-like heat shield, which with respect to the axis of rotation is arranged axially between the turbine wheel on the one hand and the compressor wheel on the other hand. Through a rotationally fixed connection of the heat shield with the rotor it is intended to achieve an improved heat resistance.

With current charging devices, individual parts of a rotor, for example a shaft, a compressor wheel and/or a turbine wheel are connected to one another for example through welding and/or screwing.

SUMMARY

The present invention deals with the problem of stating an improved embodiment for a rotor of the generic type, which is characterized in particular through a cost-effective and effective connection of two individual parts of the rotor.

According to the invention, this problem is solved through the subjects of the independent claims. Advantageous embodiments are subject of the dependent claims.

A rotor of a charging device known per se, in particular with a rotor of an exhaust gas turbocharger, having at least two parts fastened to each other, which together enclose a hollow space, the present invention is based on the general idea of sealing such hollow space in such a manner that a negative pressure, in particular even a vacuum can be created in said hollow space and because of this the individual parts are held together or fixed together only because of the negative pressure prevailing in the hollow space. In contrast with previously known welding methods for fixing individual parts of the rotor to one another, a thermal loading of the material in the region of an otherwise necessary weld seam and additionally a reduction of the weight of the rotor can be achieved through this. Obviously, it must be possible to maintain the sealing of the hollow space in the long term since the negative pressure prevailing in the hollow space is preferentially solely decisive for fixing the two parts to one another. Producing two parts which together enclose a hollow space, which in addition can be sealed off such that a negative pressure prevailing therein ensures the cohesion of the two parts, on the one hand requires a comparatively high manufacturing precision of the individual parts, but on the other hand makes possible a completely alternative connecting method, which in particular manages without additional fastening means, such as for example screws, and without additional fastening operations, such as for example welding the two parts together.

The two parts can for example originate from the following list: compressor wheel, turbine wheel, heat shield, rotor shaft. It is thus conceivable that via the hollow space enclosed between the two parts and the negative pressure contained therein a compressor wheel for example can be fastened to a rotor shaft, a compressor wheel to a turbine wheel, a heat shield on the rotor shaft or a compressor wheel to the heat shield. The previously named listing obviously does not lay any claim to completeness, so that further components which not even belong to the rotor can be fixed to one another by means of a hollow space jointly enclosed by this component and a negative pressure prevailing therein.

With an advantageous further development of the solution according to the invention, the two parts tightly bear against one another via axial end faces, wherein the end faces can be formed straight, curved or conically. In addition, the end faces can be surface-furnished, in particular polished. The intention here is to establish in particular a comparatively high surface quality and surface precision on the contact surfaces (end faces) of the two parts, as a result of which maintaining of the negative pressure, in particular of the vacuum, in the hollow space enclosed between the two parts can be guaranteed even in the long term.

With a further advantageous embodiment of the solution according to the invention, at least one of the two parts has a titanium coating or is even entirely formed of titanium or a titanium alloy. Here, the generally known fact that titanium has the capability of forming bonds between the individual atoms under pressure is utilised. Thus, a cold-fusion under pressure takes place on the contact surface formed of titanium or coated with a titanium coating. The pressure of the two parts against each other for forming the cold-fusion-connection in this case is brought about for example by a press acting from the outside, but via the negative pressure prevailing in the hollow space between the two parts.

Obviously, one of the two parts can also be formed of ceramic or have a ceramic coating, in particular on the respective contact surfaces. Ceramic is a poor heat conductor and additionally highly heat-resistant, so that for example the forming of a heat shield of ceramic and its connection via a hollow space with negative pressure prevailing there to a second part (component) of the rotor is made possible. Before the actual connecting of the two parts of the rotor by means of negative pressure, a centring usually takes place so that the rotor at least partially consisting of the two parts does not have any imbalance.

The connecting of the two parts can be effected for example in a negative pressure chamber or a vacuum chamber, wherein the enclosed negative pressure when retrieving the two parts from the chamber is enclosed and because of this is retained and can exert its holding force.

With a rotor of a charging device, in particular with a rotor of an exhaust gas turbocharger, having at least two parts fastened to one another, the invention furthermore is based on the general idea of forming at least one of these two parts of titanium or a titanium alloy or providing these by means of a titanium coating on a contact surface to the other part and connecting these with the other component via a cold-fusion-connection under pressure there. As already mentioned in the preceding paragraphs, titanium has the ability of forming atomic bonds under pressure, so that on generating a corresponding contact pressure a cold-fusion-connection between the two parts can be established. In contrast with the hollow space described in the previous section with the negative pressure prevailing therein, the pressure required for establishing the cold fusion connection can also be generated from the outside for example by means of a press. With this configuration, too, the two components to be connected can for example be again formed as compressor wheel, as turbine wheel, as heat shield or as rotor shaft. It is likewise conceivable that at least one of the two parts is not formed of titanium or a titanium alloy, but rather of ceramic.

With a rotor of a charging device, in particular with a rotor of an exhaust gas turbocharger having at least two parts fastened to each other, the invention furthermore, is based on the general idea of connecting the two parts to one another via a thermally active engagement connection. Here, too, the two parts can again be formed as compressor wheel, as turbine wheel, as heat shield or as rotor shaft. With a direct connection of a compressor wheel to a turbine wheel the establishing of a groove on the compressor wheel and an associated angular collar on the turbine wheel is conceivable for example, wherein for interconnecting, the compressor wheel is cooled or the turbine wheel heated and then pressed together with the respective other part. By heating the turbine wheel, the latter expands, likewise the compressor wheel contracts upon a lowering of the temperature, as a result of which the engagement connection can be closed. During a subsequent temperature equalisation, i.e. for example upon a heating of the compressor wheel and a cooling-down of the turbine wheel, the engagement connection engages in a non-detachable manner and thus ensures a secure hold of the turbine wheel on the compressor wheel and vice versa.

Obviously it is clear that the individual connecting methods mentioned before cannot only be utilised individually, but also in any combination for connecting individual parts of the rotor.

Further important features and advantages of the invention are obtained from the subclaims, from the drawings and from the associated Figure description by means of the drawings.

It is to be understood that the features mentioned above and still to be explained in the following cannot only be used in the respective combination stated but also in other combinations or by themselves, without leaving the scope of the present invention.

Preferred exemplary embodiments of the invention are shown in the drawings and are explained in more detail in the following description, wherein same reference characters relate to same or similar of functionally same components.

BRIEF DESCRIPTION OF THE DRAWINGS

Here it shows, in each case schematically.

DETAILED DESCRIPTION

Figure 1:
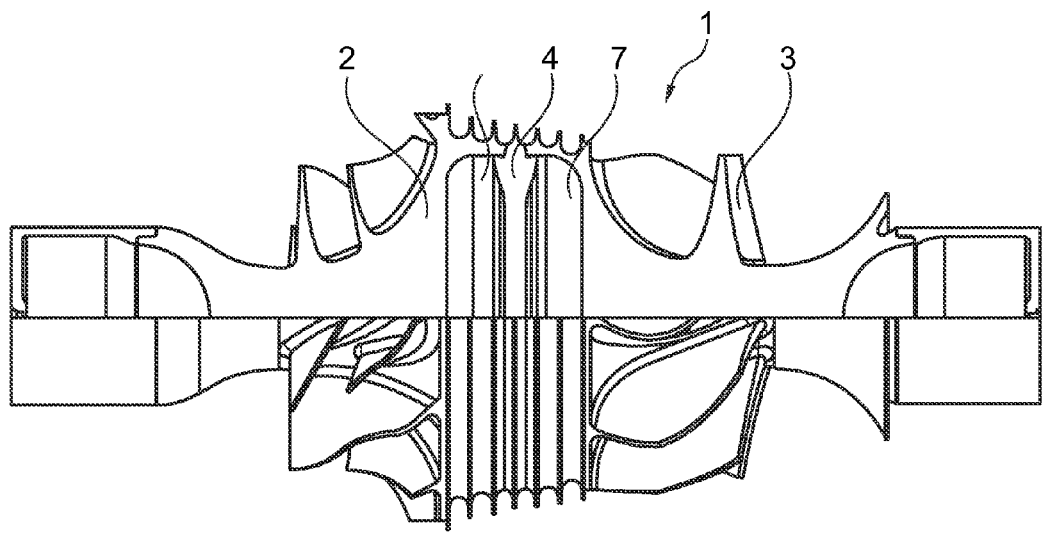
FIG. 1 a partially sectioned view of a rotor according to the invention.

According to FIG. 1, a rotor 1 according to the invention of a charging device which is not otherwise shown, for example of an exhaust gas turbocharger of a motor vehicle, comprises at least two parts 5, 6 fastened to each other, for example a turbine wheel 2, a compressor wheel 3, a heat shield 4 or a rotor shaft, which together enclose a hollow space 7, the two parts 5, 6 for example the compressor wheel 3 and the heat shield 4 in this case are preferentially fixed tightly against one another merely via a negative pressure, in particular a vacuum prevailing in the hollow space 7.

According to FIG. 1, the turbine wheel 2 in this case is connected to the heat shield 4 via the hollow space 7' arranged in between and the heat shield 4 to the compressor wheel 3 via the hollow space 7 located in between by means of negative pressure, in particular by means of vacuum. Obviously, the fixing of the turbine wheel 2 directly to the compressor wheel 3 is also conceivable by means of such a negative pressure connection.

Figures 2, 3:
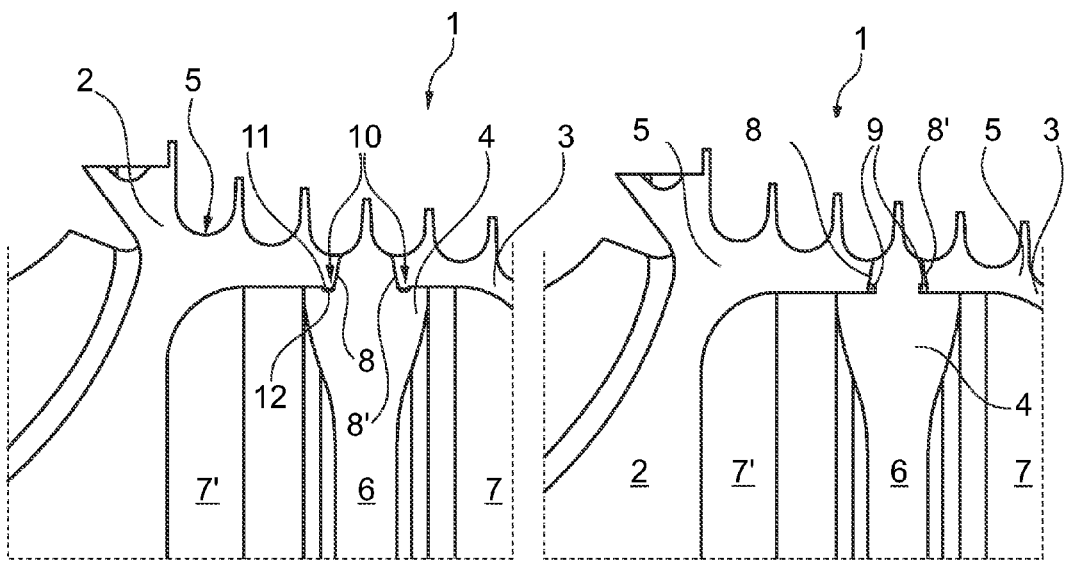
FIG. 2 a detail representation from FIG. 1.
FIG. 3 a representation as in FIG. 2, however with another embodiment.

Considering for example the turbine wheel and the compressor wheel 3 according to FIG. 2, it is evident that these have axially sloping end faces 8 and 8'. With these end faces 8, 8' these bear against end faces of the heat shield 4 formed complementarily thereto, which can be formed for example of ceramic. The end faces 8 and 8' can obviously be formed straight, curved or even conically and in particular have a surface finish, for example through polishing.

In order to be able to bring about a sealing of the hollow space 7 and 7' respectively, a seal 9 can be additionally arranged in the region of the axial end faces 8, 8', as is shown for example according to FIG. 3. With the connecting method shown, a fixing of at least two parts 5, 6 of the rotor 1 to each other preferentially takes place exclusively via the negative pressure prevailing in the hollow space 7 located between the two parts 5, 6.

At least one of the two parts 5, 6 can b formed of titanium, or comprise a titanium coating, in particular on an end face 8, 8', as a result of which because of the negative pressure prevailing in the hollow space 7, 7' a surface pressure is achieved on the end faces 8, 8' that is so high that a cold-fusion occurs there. For titanium and titanium alloys have a tendency to atomic bonds under pressure, as a result of which a cold-fusion without the supply of heat is conceivable. Obviously, both parts 5, 6 can be formed in this case of titanium or one of the two parts 5, 6 can be formed of ceramic or have a ceramic coating. Obviously, for connecting exclusively by means of negative pressure, other materials can also be employed, wherein for establishing the cold-fusion connection, at least one of the two components has to be formed of titanium or a titanium alloy or comprise such a titanium coating. The contact surfaces or the end faces 8, 8' via which the two parts 5, 6 according to FIG. 2 compressor wheel 2 is connected to the heat shield 4, lie at a maximum diameter of the two parts 5, 6 and additionally provide a centring function.

Additionally or alternatively to the pure negative pressure connection of the two parts 5, 6, a cold-fusion can be enforced on the end faces 8, 8' or on the contact surfaces, wherein the pressure required for this can be brought about by means of the negative pressure prevailing in the hollow space 7, 7' and/or by an additional mechanical pressure applied from the outside, for example by means of a press. For establishing the cold-fusion connection, however, it is imperative that at least one of the two parts 5, 6 to be connected to each other is embodied of titanium or a titanium alloy.

With a further possible embodiment of the solution according to the invention, the two parts 5, 6, are interconnected according to FIG. 2 the compressor wheel 2 to the heat shield 4 and the heat shield 4 to the turbine wheel 3 via a thermally active engagement connection 10. For enclosing the engagement connection, the turbine wheel 2 for example is heated and the heat shield 4 cooled as a result of which an engagement lug 11 on the turbine wheel 2 can engage into an associated groove 12 on the heat shield 4. During temperature equalisation, i.e. during a cooling of the turbine wheel 2 and a heating of the heat shield 4, the thermally active engagement connection 10 closes, as a result of which a non-releasable connection of the turbine wheel 2 to the heat shield 4 can be achieved. In a similar manner, the compressor wheel 3 can obviously also be connected to the heat shield 4 or with a suitable embodiment, directly to the turbine wheel 2.

Obviously it is also conceivable that the previously mentioned connecting methods cannot only be used individually, but also combined in any combination. With the connections according to the invention a simple and cost-effective connecting of the two components 5, 6 in particular can be achieved, without additional fastening means, such as for example screws and without any additional thermal loading.

The invention claimed is:

1. A rotor of a charging device, comprising:
    at least two parts disposed coaxially along a rotation axis each having an axial end face positioned facing one another in an axial direction with respect to the rotation axis, wherein the axial end face of each of the at least two parts together enclose a vacuum sealed hollow space,
    wherein the vacuum sealed hollow space maintains a negative pressure facilitating a suction-secured connection between the at least two parts.

2. The rotor according to claim 1, wherein the at least two parts include at least one of a compressor wheel, a turbine wheel, a heat shield, and a rotor shaft.

3. The rotor according to claim 1,
    wherein the at least two parts tightly bear against each other via the respective axial end faces, wherein the axial end face of the at least two parts is configured at least one of straight, curved and conical, and
    wherein the axial end faces are surface-finished.

4. The rotor according to claim 1, wherein at least one of the two parts includes a titanium material.

5. The rotor according to claim 1, wherein at least one of the two parts includes a ceramic material.

6. The rotor according to claim 1, wherein the axial end face of the at least two parts are connected to each other at a contact surface, and wherein at least one contact surface includes a pressure activated cold-fusion sealing surface to define a cold-fusion connection between the contact surface of each axial end face of the at least two parts.

7. A rotor of a charging device, comprising:
    at least two parts disposed coaxially along a rotation axis each having an axial end face positioned facing one another in an axial direction with respect to the rotation axis, wherein the axial end face of the at least two parts are connected to each other at a contact surface, wherein the contact surface of at least one of the two parts includes a pressure activated cold-fusion sealing surface composed of a titanium-based material connected to the contact surface of the other one of the at least two parts via a pressure induced cold-fusion-connection.

8. The rotor according to claim 7, wherein at least one of the two parts is formed of ceramic.

9. The rotor according to claim 7, wherein the axial end face of the at least two parts together enclose a vacuum sealed hollow space, and wherein the vacuum sealed hollow space maintains a negative pressure facilitating a suction-secured connection between the at least two parts.

10. The rotor according to claim 7, further comprising a compressor wheel configured to lie at a maximum diameter of the two parts.

11. The rotor according to claim 7, wherein at least one of the two parts is formed of titanium.

12. A rotor of a charging device, comprising:
    at least two parts disposed coaxially along a rotation axis, the at least two parts each having an axial end face positioned facing one another in an axial direction with respect to the rotation axis, wherein the axial end face of at least one of the at least two parts includes a groove and the axial end face of the other of the at least two parts includes an engagement lug, and wherein the engagement lug is press fit in the groove defining a thermally activated engagement connection securing the at least two parts together without forming a metallurgical joint.

13. The rotor according to claim 12, wherein the two parts engage at least one of a compressor wheel, turbine wheel, heat shield, and rotor shaft.

14. The rotor according to claim 12, wherein the axial end face the at least two parts together enclose a vacuum sealed hollow space, the vacuum sealed hollow space maintaining a negative pressure facilitating a suction-secured connection between the at least two parts.

15. The rotor according to claim 12, wherein at least one of the two parts is formed of ceramic.

16. The rotor according to claim 12, further comprising a compressor wheel configured to lie at a maximum diameter of the two parts.

17. A rotor of a charging device, comprising:
    at least two parts disposed coaxially along a rotation axis and each having an axial end face positioned facing one another in an axial direction with respect to the rotation axis, wherein the two parts are to each other at a connection, and wherein the connection includes at least two of:
        a thermally activated engagement connection, wherein the axial end face of at least one of the at least two parts includes a groove and the axial end face of the other of the at least two parts includes an engagement lug, and wherein the engagement lug is press fit in the groove without forming a metallurgical joint;
        a pressure induced cold-fusion-connection, wherein the axial end face of at least one of the at least two parts includes a pressure activated cold-fusion contact surface, and wherein the pressure activated cold-fusion contact surface sealingly engages a contact surface of the other one of the at least two parts; and
        a suction secured connection, wherein the axial end face of each of the at least two parts together enclose a vacuum sealed hollow space, and wherein the vacuum sealed hollow space maintains a negative pressure holding the at least two parts together.

18. The rotor according to claim 17, wherein at least one of the two parts is formed of titanium.

19. The rotor according to claim 17, wherein at least one of the two parts is formed of ceramic.

20. The rotor according to claim 17, further comprising a compressor wheel configured to lie at a maximum diameter of the two parts.

* * * * *